(12) United States Patent
Tejaprakash et al.

(10) Patent No.: US 9,769,101 B2
(45) Date of Patent: Sep. 19, 2017

(54) CENTRALIZED COMMUNICATIONS CONTROLLER

(71) Applicant: Verizon Patent and Licensing Inc., Arlington, VA (US)

(72) Inventors: Nitheesh Tejaprakash, Tampa, FL (US); Shekhar Kopuri, Wesley Chapel, FL (US); Angan Adhikari, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 14/593,018

(22) Filed: Jan. 9, 2015

(65) Prior Publication Data

US 2016/0205053 A1 Jul. 14, 2016

(51) Int. Cl.
*G06F 15/16* (2006.01)
*H04L 12/58* (2006.01)

(52) U.S. Cl.
CPC .................................. *H04L 51/14* (2013.01)

(58) Field of Classification Search
None
See application file for complete search history.

(56) References Cited

U.S. PATENT DOCUMENTS

| | | | | |
|---|---|---|---|---|
| 9,146,893 | B1* | 9/2015 | Garg | G06F 15/16 |
| 2006/0184679 | A1* | 8/2006 | Izdepski | H04L 67/2823 |
| | | | | 709/229 |
| 2008/0147746 | A1* | 6/2008 | Bauchot | H04L 51/08 |
| 2008/0246605 | A1* | 10/2008 | Pfeffer | G06Q 10/06 |
| | | | | 340/540 |
| 2009/0292779 | A1* | 11/2009 | Edlund | G06Q 10/10 |
| | | | | 709/206 |

\* cited by examiner

*Primary Examiner* — Lance Leonard Barry
*Assistant Examiner* — Mohammad Yousuf A Mian

(57) ABSTRACT

A message or system may receive a message, and may determine contents and metadata associated with the message. The contents and metadata may be used to identify another user device, such as a device located at a different entity. A notification message or a copy of the message may be forward to the other device. The copy may be formatted to be compatible with the other device. The notification message or the copy of the message may be forwarded to the other device. Additionally, an interface may be forwarded to the other device to enable the other device to access data regarding the message or other messages.

20 Claims, 9 Drawing Sheets

FIG. 4

| MESSAGE IDENTIFIER 410 | USER DEVICE IDENTIFIERS 420 | MESSAGE TYPE 430 | MESSAGE CONTENTS 440 | PROJECT IDENTIFIER 450 | OTHER DATA 460 |
|---|---|---|---|---|---|
| MESSAGE NUMBER 1 | USER DEVICE 1-A USER DEVICE 1-B | TYPE 1 | CONTENT 1 | PROJECT IDENTIFIER 1 | OTHER DATA 1 |
| ... | ... | ... | ... | ... | ... |
| MESSAGE NUMBER N | USER DEVICE N-A USER DEVICE N-B | TYPE N | CONTENT N | PROJECT IDENTIFIER N | OTHER DATA N |

400

CENTRALIZED COMMUNICATIONS CONTROLLER

BACKGROUND INFORMATION

An electronic mail (e-mail) is a digital message exchanged from an author to one or more recipients across the Internet or other computer networks. An e-mail server may accept and store an e-mail message and may forward the e-mail message to an intended recipient. The format for email messages is defined in the Request for Comments (RFC) 5322 by the Internet Engineering Task Force (IETF) and the Internet Society, with multi-media content attachments being further defined in RFC 2045 through RFC 2049, collectively called Multipurpose Internet Mail Extensions (MIME). An email message may include a message header storing control information, a message body storing content, and a message envelope separating the message header and the message body. For example, the message header may contain an originator's email address, one or more recipient addresses, and/or other descriptive information, such as a subject header field and a message submission date/time stamp. The message body may include a text string and/or attachments, such as multimedia content, a data file, and/or an application.

BRIEF DESCRIPTION OF THE DRAWINGS

FIG. 4 shows a exemplary table storing data that may be collected and stored within the environment of FIG. 1;

DETAILED DESCRIPTION OF PREFERRED EMBODIMENTS

The following detailed description refers to the accompanying drawings. The same reference numbers in different drawings identify the same or similar elements.

A message or system receives a message, and contents and metadata associated with the message are determined. The contents and metadata may be used to identify another user device, such as a device located at a different entity. A notification message or a copy of the message may be forward to the other device. The copy may be formatted to be compatible with the other device. The notification message or the copy of the message may be forwarded to the other device. Additionally, an interface may be forwarded to the other device to enable the other device to access data regarding the message or other messages.

Figure 1:
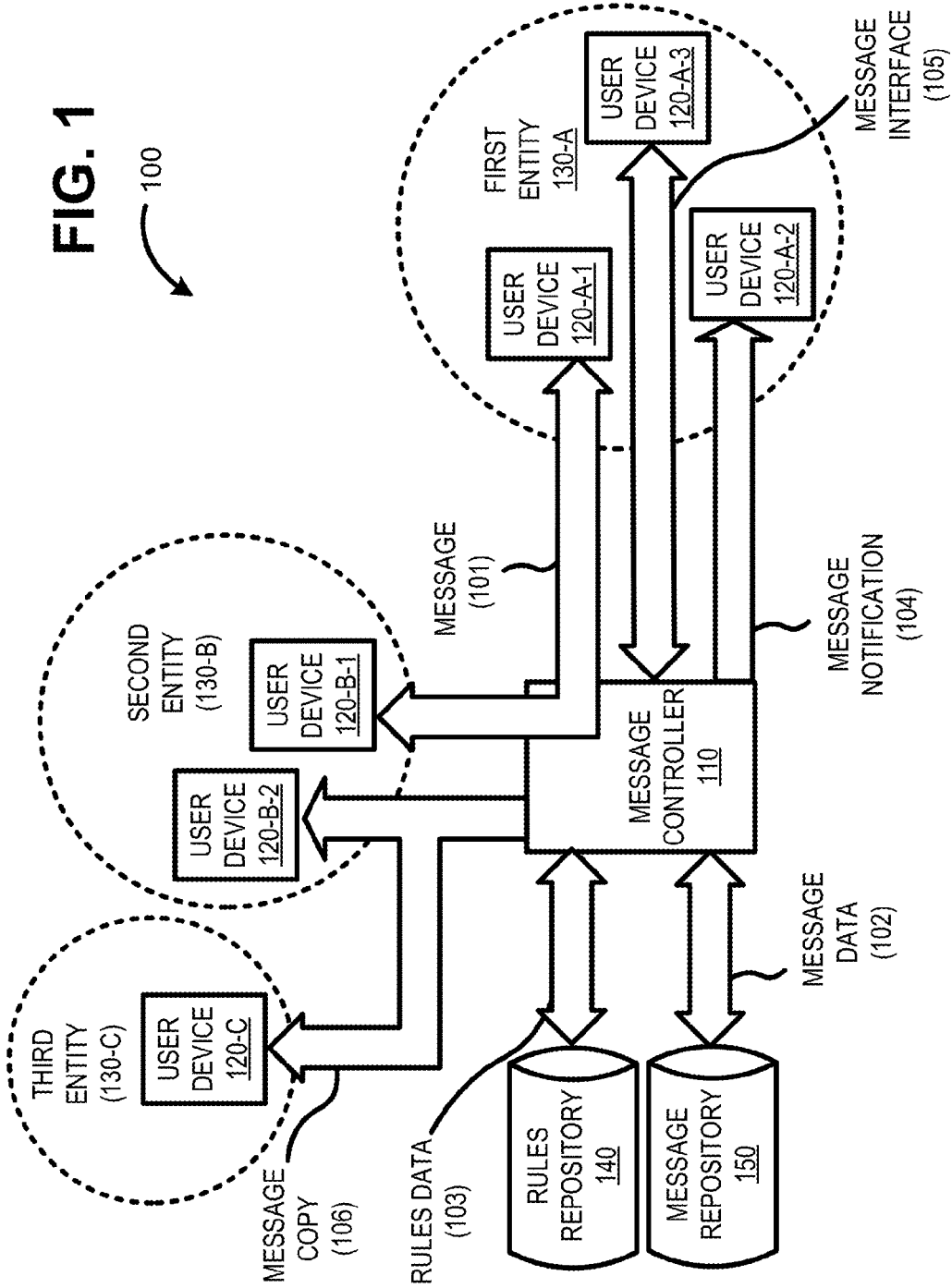
FIG. 1 is a diagram illustrating an exemplary environment according to implementations described herein.

FIG. 1 is a diagram showing an exemplary environment 100 in which the systems and/or methods, described herein, may be implemented. As shown in FIG. 1, environment 100 may include a message controller 110, user devices 120 (shown in FIG. 1 as user devices 120-A-1 through 120-A-3 associated with entity 130-A, user devices 120-B-1 and 120-B-2 associated with entity 130-B, and user device 120-C associated with entity 130-C), a rules repository 140, and a message repository 150.

As shown in FIG. 1, message controller 110 may receive data associated with a message 101 being exchanged between user device 120-A-1 and 120-B-1 (e.g., between a first entity 130-A and a second entity 130-B). For example, a copy of message 101 may be routed via a messaging system (not shown) through message controller 110. Additionally or alternatively, message controller 110 may receive data associated with message 101, such as data identifying user devices 120-A-1 and 120-B-1 exchanging message 101, data regarding the contents of message 101, data identifying components/paths/networks carrying message 101, data identifying entities 130-A and 130-B, etc.

Message 101 may include various message types and/or formats. For example, message 101 may include (1) a text-based message such as an e-mail, a short message system (SMS) message etc.; (2) a multimedia message such as an image, a video, an audio recording, a voice over Internet Protocol (VoIP) telephone content, a multimedia SMS message, etc.; (3) an analog communications such as a circuit switched plain old telephone system (POTS) communications; or (4) other data such as a document, program data, etc. In one implementation, message 101 may be transmitted as a packet or other data unit that includes a header identifying, for example, end-point user devices 120-A-1 and 120-B-1 exchanging message 101, a format of message 101, components/paths/networks carrying message 101, etc.

Continuing with FIG. 1, message controller 110 may analyze message 101 and/or associated information to generate message data 102 and may store message data 102 to message repository 150. For example, message controller 110 may identify and store contents of message 101 and metadata associated with message 101, such as information identifying user devices 120-A-1 and 120-B-1, a format of message 101, a project associated with message 101, etc.

For example, after receiving message 101, message controller 110 may parse message 101 to extract metadata identifying user device 120-A-1 and/or 120-B-1. For example, message controller 110 may parse message 101 to determine a network address (e.g., IP or media access control, or MAC, address) telephone number, serial number, a device type, etc. associated with user device 120-A-1 and/or 120-B-1. In another implementation, message controller 110 may use the data included in message 101 to establish communications with user devices 120-A-1 and/or 120-B-1 or other another device (not shown in FIG. 1) to obtain information regarding user devices 120-A-1 and/or 120-B-1. For example, message controller 110 may use authentication data, session data, etc. included in message 101 to communicate with user devices 120-A-1 and/or 120-B-1 and to obtain the identifier, a location (e.g., a global positioning system value), or other information associated with user devices 120-A-1 and/or 120-B-1.

In one implementation, message controller 110 may determine additional metadata to include in message data 102. For example, message controller 110 may identify (e.g., search for) additional metadata based on the contents or metadata extracted from message 101. For example, identifiers associated with user devices 120-A-1 and 120-B-1 (e.g., an IP address, telephone number, etc.) may be used to identify names, entities 130, locations, positions, etc. of users associated with user devices 120-A-1 and 120-B-1. In another example, message controller 110 may obtain data regarding other messages exchanged by user devices 120-A and/or 120-B-1 or other messages related to a project and/or a topic associated with message 101.

Additionally or alternatively, message controller 110 may receive information related to message data 102 via message 101 from user devices 120-A-1 and/or 120-B-1. For example, message controller 110 may receive annotations, comments, notes, etc. from user devices 120-A-1 and/or 120-B-1. For example, message controller 110 may provide an interface to receive inputs from user devices 120-A-1 and/or 120-B-1 related to message 101, and may generate message data 102 based on the received inputs.

As shown in FIG. 1, message controller 110 may access rules data 103 stored in rules repository 140. Rules data 103 may direct message controller 110, for example, to send a message notification 104 to user device 120-A-2. Rules data 103 may define, for example relationships between different user devices 120 and/or entities 130. For example, rules data 103 may indicate that message 101 exchanged by user device 120-A-1 should be reported to user device 120-A-2 (e.g., if a user associated with user device 120-A-2 is a supervisor of a user associated with a user associated with user device 120-A-1). Rules data 103 may further indicate, for example, that contents of a certain message 101 exchanged by user device 120-B-1 (e.g., message copy 106) should be forwarded to user devices 120-B-2 and/or 120-C (e.g., if a user associated with user device 120-B-2 is a coworker assigned to a same project as a user associated with user device 120-B-1). For example, business rules 103 may include data indicating that a certain message 101, message notification 104 related to the certain message 101, a message interface 105 identifying the certain message 101, and/or a message copy 106 forwarded a portion of the certain message 101 should be automatically forwarded to a particular user or group of users when the certain message 101 includes a certain phrase and/or exchanged by a user device 120 associated with a certain user.

Rules data 103 may further include information indicating a manner of delivery of message 101, message notification 104, message interface 105, and/or message copy 106 to the certain user. For example, rules data 103 may indicate whether the information should be delivered via e-mail (or other messaging service), a SMS service, in a multimedia format (e.g., as an audio message delivered via a telephone service), as a web page via HTTP, etc. For example, rules data 103 may identify content compatible with a certain user device 120. Rules data 103 may further identify a particular encoding for the certain user, such as to encode the delivered content using a particular encoding scheme and/or encoding key associated with the certain user. For example, rules data 103 may indicate that content intended for user device 120-A-1 and regarding certain topics and/or related to a message 101 exchanged by a particular other user device 120 (e.g., user device 120-A-2 within the same entity 130-A).

Message notification 104 may include an indication that message 101 is being sent between user devices 120-A-1 and 120-B-1. As used herein, message notification 104 may include an indication of the contents of message 101 (e.g., a excerpt) and generally does not include a substantial portion (e.g., more than half) of the contents from message 101. For example, message notification 104 may include a subject, synopsis, sample (e.g., a thumbnail or excerpt) and/or preview of the contents of message 101. Message notification 104 may also provide an indication that message data 102 is available for access by user device 120-A-2. For example, message controller 110 may include data, such as a storage location in message repository 150 or other information that may be used by user device 120-A-2 to access message data 102. In another example, message repository 150 may store message data 102 in an encrypted and/or encoded form, and data message controller 110 may include data, such as a decryption code, that may be used by user device 120-A-2 to access message data 102.

As shown in FIG. 1, message controller 110 may provide a message interface 105 to enable user device 120-A-3 to access message data 102. For example, message interface 105 may include a graphical user interface (GUI) that presents a portion of message data 102 and may enable user device 120-A-3 (e.g., based on receiving a user input) to access other message data 102, such the contents of message 101. Message controller 110 may provide message interface 105 based on receiving a request from user device 120-A-3. Alternatively, message controller 110 may provide message interface 105 without receiving the request from user device 120-A-3, such as providing message interface 105 in connection with message notification 104 and/or based on rules data 103. For example, message controller 110 may dynamically provide message interface 105 to user device 120-A-3 based on determining that user device 120-A-3 is associated with a co-worker or supervisor of a user of user device 120-A-1 that exchanged message 101.

In another example shown in FIG. 1, rules data 103 may direct message controller 110 to forward a message copy 106 to user devices 120-B-2 and/or 120-C. For example, rules data 103 may automatically identify user devices 120-B-2 and/or 120-C based on the contents of message, based on users associated with user devices 120-A-1 and/or 120-B-1, based on message data 102 (e.g., comments received from user devices 120-A-1 and/or 120-B-1), etc. Message copy 106 may include at least a substantial portion (e.g., more than half) of the contents from message 101. Message copy 106 may further include other message data 102, such as information identifying user devices 120-A-1 and/or 120-B-1 or other metadata.

Although it is visually implied in FIG. 1 that user devices 120-B-2 and/or 120-C receive a similar message copy 106 from message controller 110, it should be appreciated that different message copies 106 may be forwarded to each of user devices 120-B-2 and 120-C. For example, message controller may provide a first message copy 106 that includes a first portion of message data 102 (e.g., data related to entity 130-B) to user device 120-B-2 and may provide a second different message copy 106 that includes a second, different portion of message data 102 (e.g., data related to entity 130-C) to user device 120-C. In this example, message controller 110, when forwarding message copy 106 to user device 120-C associated with third entity 130-C, may remove proprietary information associated with first entity 130-A and/or second entity 130-B.

In one implementation, message copy 106 may be formatted and/or modified to be compatible with user devices 120-B-2 and/or 120-C. Additionally or alternatively, if message copy 106 is encrypted and/or encoded (e.g., based on rules data 103), message copy 106 may include data, such as a decryption and/or decoding code that may be used by user devices 120-B-2 and/or 120-C to decrypt and/or decode message copy 106.

As used herein, user device 120 may include any device that is capable of transmitting message 101. For example, user device 120 may include a portable communication device (e.g., a mobile phone, a smart phone, a phablet device, a global positioning system (GPS) device, and/or another type of wireless device); a laptop, tablet, or another type of portable computer; a media playing device; a portable gaming system; and/or any other type of mobile computer device with communication and output capabilities. Each of entity 130-A, 130-B and 130-C may correspond to a business, school, or other type of organization (e.g., a collective group of users devices 120). For example, user devices 120 within an entity 130 may be connected via a private network.

Rules repository 140 and message repository 150 may include a memory or dynamic storage device that may store information and/or instructions to store, respectively, rules data 103 and message data 102. For example, each of rules repository 140 and message repository 150 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory. In another example, both rules repository 140 and message repository 150 may be stored on a single memory device.

Although FIG. 1 shows exemplary components of environment 100, in other implementations, environment 100 may include fewer components, different components, differently arranged components, or additional components than those depicted in FIG. 1. For example, FIG. 1 shows that environment 100 provides message notification 104 and message interface 105 to user devices 120-A-2 and 120-A-3, respectively, associated with the first entity 130-A (e.g., an entity associated with user device 120-A-1 exchanging message 101), but environment 100 may also provide one or more of message notification 104 or message interface 105 to a user device associated with the different entity (e.g., third entity 130-C or another entity 130 not shown in FIG. 1). Additionally or alternatively, one or more components of environment 100 may perform functions described as being performed by one or more other components of environment 100.

Figure 2:
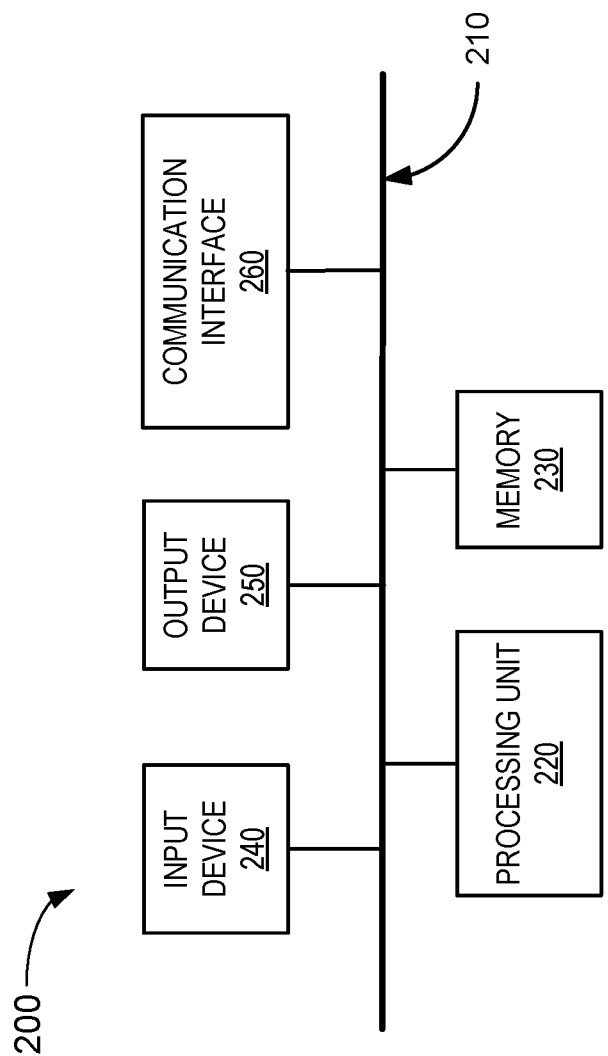
FIG. 2 is a diagram illustrating exemplary components of a device that may be included in the environment of FIG. 1.

FIG. 2 is a diagram illustrating exemplary functional components of device 200 according to an implementation described herein. Message controller 110, user devices 120, rules repository 140, and message repository 150 may each include one or more devices 200. As shown in FIG. 2, device 200 may include a bus 210, a processing unit 220, a memory 230, an input unit 240, an output unit 250, and a communication interface 260.

Bus 210 may include a path that permits communication among the components of device 200. Processing unit 220 may include any type of single-core processor, multi-core processor, microprocessor, latch-based processor, and/or processing logic (or families of processors, microprocessors, and/or processing logics) that interprets and executes instructions. In other embodiments, processing unit 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processing unit 220, and/or any type of non-volatile storage device that may store information for use by processing unit 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 240 may allow an operator to input information into device 200. Input unit 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input unit 240. In other words, device 200 may be "headless" and may not include a keyboard, for example.

Output unit 250 may output information to an operator of device 200. Output unit 250 may include a display, a printer, a speaker, and/or another type of output device. For example, device 200 may include a display, which may include a liquid-crystal display (LCD) for displaying content to the customer. In some embodiments, device 200 may be managed remotely and may not include output unit 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

Device 200 may perform certain operations in response to processing unit 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processing unit 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
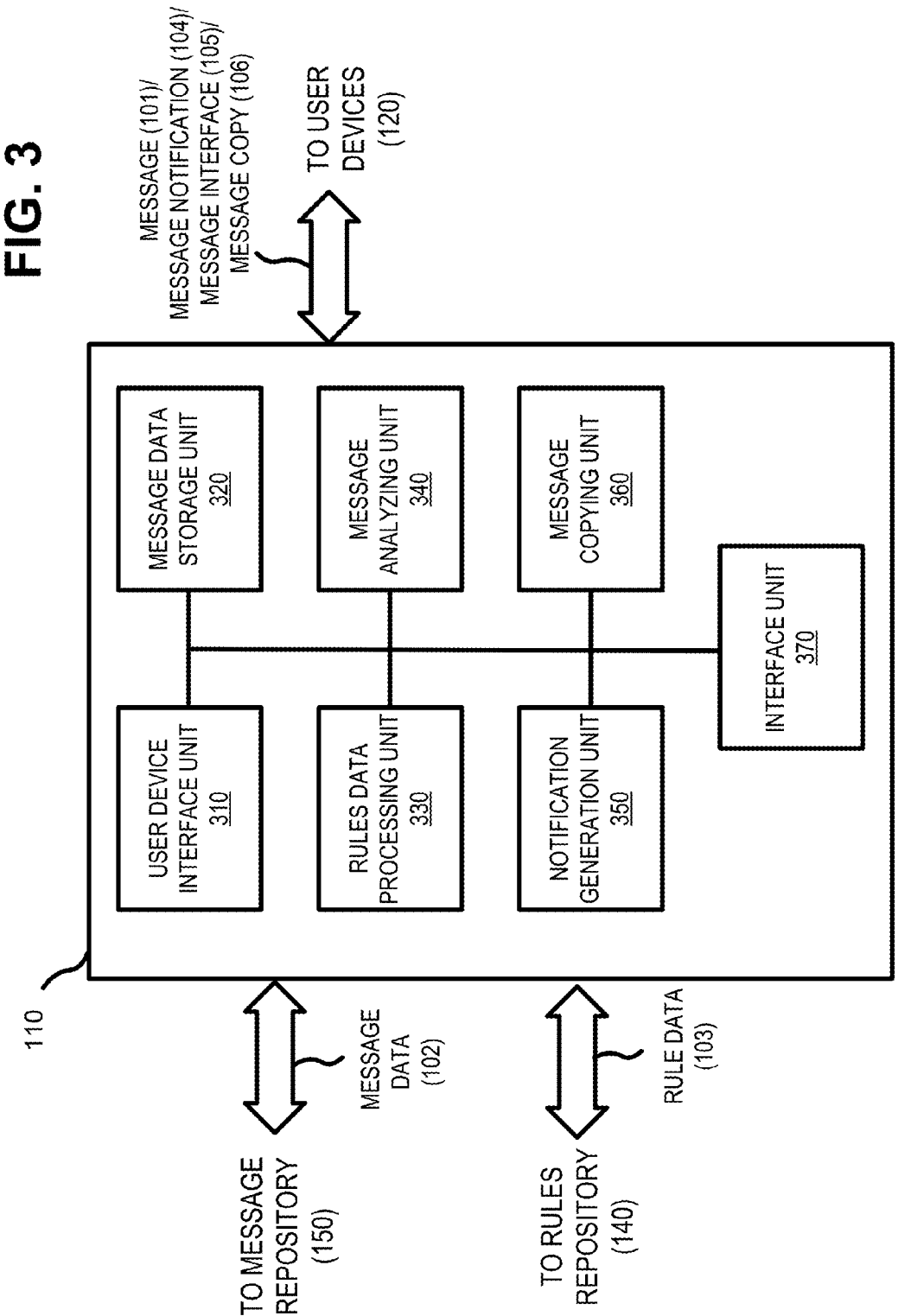
FIG. 3 is a diagram illustrating exemplary functional components of a message controller that may be included in the environment of FIG. 1.

FIG. 3 is a diagram illustrating exemplary functional components of message controller 110 according to an implementation described herein. The functional components of message controller 110 may be implemented, for example, via processing unit 220 executing instructions from memory 230. Alternatively, some or all of the functional components of message controller 110 may be implemented via hard-wired circuitry. As shown in FIG. 3, message controller 110 may include a user device interface unit 310, a message data storage unit 320, a rules data processing unit 330, a message analyzing unit 340, a notification generation unit 350, a message copying unit 360, and an interface unit 370.

User device interface unit 310 may function to exchange data with one or more user devices 120. For example, user device interface unit 310 may receive data associated with message 101 that is exchanged between user devices 120-A-1 and 120-B-1. For example, user device interface unit 310 may interface with a routing/networking device (not shown) to cause a copy of message 101 to be routed to user device interface unit 310. Alternatively, user device interface unit 310 may interface with the routing/networking device to cause message controller 110 to be included in a communications path between user devices 120-A-1 and 120-B-1 (e.g., so that message 101 is routed via message controller 110). Additionally or alternatively, user device interface unit 310 may further communicate with the routing/networking device to receive routing information regarding message 101, such as data identifying user devices 120-A-1 and 120-B-1, a protocol used to exchange message 101, a time when message 101 is sent, data regarding other messages exchanged between user devices 120-A-1 and 120-B-1 during a particular time period, information regarding related messages (e.g., messages associated with similar content) exchanged between user device 120-A-1 or 120-B-1 and another user device 120, etc.

User device interface unit 310 may exchange data associated with message notification 104 (received from notification generation unit 350), message interface 105 (received from interface unit 370), and/or message copy 106 to one or more user devices 120. For example, user device interface unit 310 may receive instructions from rules data processing unit 330 to forward message notification 104, message interface 105, and/or message copy 106 to a particular user device 120.

As shown in FIG. 3, message controller 110 may include message data storage unit 320 to store/access message data 102 in message repository 150. For example, message data storage unit 320 may extract contents from message 101 to store to message repository 150. For example, if message 101 includes text (e.g., message 101 corresponds to an e-mail, text document, SMS message, etc.), message data storage unit 320 may store a text string included in message 101 to message repository 150. If message 101 includes multimedia content, such as audio and/or video content, message data storage unit 320 may store the audio and/or video content to message repository 150. Alternatively, message data storage unit 320 may identify a location storage contents of message 101 (e.g., a memory in user device 120-A-1 and/or 120-B-1 or another device) and may store data identifying the storage location to message repository 150.

Message data storage unit 320 may also store metadata from message 101. For example, message data storage unit 320 may receive, from user device interface unit 310, metadata related to the transmission of message 101, such as data identifying user devices 120-A-1 and 120-B-1, other user devices 120 receiving message 101, a protocol used to transmit message 101, etc. In another example, message data storage unit 320 may receive metadata from message analyzing unit 340 that is extracted from message 101 and/or obtained using information extracted from message 101. For example, message data storage unit 320 may receive metadata from message analyzing unit 340 related to other messages associated with a subject (e.g., a keyword) of message 101.

When storing message data 102 to message repository 150, message data storage unit 320 may store, as message data 102, data from message 101 and/or related metadata in a received format. For example, message data storage unit 320 may store contents from message 101 in a format/protocol used within message 101. Alternatively, message data storage unit 320 may process and store message data 102 in a different format. For example, message data storage unit 320 may convert message data 102 to a different format that is more secure, compressed (e.g., requiring less storage space in message repository 150), and/or easier to access and/or locate within message repository 150.

Message data storage unit 320 may further function to obtain message data 102 from message repository 150 and to provide the obtained message data 102 to another component of message controller 110. For example, message data storage unit 320 may obtain message data 102 from message repository 150 and provide the obtained message data: to rules data processing unit 330 for processing rules data 103; to message analyzing unit 340 to obtain additional message data 102; to notification generation unit 350 to generate message notification 104; to message copying unit 360 to generate message copy 106; and/or to interface unit 370 to form message interface 105. Message data storage unit 320 may convert message data 102 to a different format that is more secure (e.g., to maintain and monitor access control), compressed (e.g., requiring less storage space in message repository 150), and/or easier to access and/or locate within message repository 150.

When providing message data 102 to another component of message controller 110, message data storage unit 320 may convert message data 102 from a first format used to store message data 102 in message repository 150 to a second, different format. For example, message data storage unit 320 may convert message data 102 into a format that is compatible, when included in message copy 106, with a recipient user device 120-B-2 and/or 120-C.

As shown in FIG. 3, message controller 110 may include rules data processing unit 330 to process rules data 103 obtained from rules repository 140. For example, rules data processing unit 330 may determine and apply rules data 103 associated with message 101 based on message data 102 received from message data storage unit 320. For example, rules data processing unit 330 may select applicable rules data 103 based on the position/title of users associated with user devices 120-A-1 and 120-B-1; based on the contents of message 101; based on other metadata included in message data 102 (e.g., a status of a project referenced within message 101); etc.

For example, rules data processing unit 330 may use rules data 103 to identify user devices 120-B-2 and 120-C to receive message copy 106 and another user device 120-A-2 to receive message notification 104. In one implementation, rules data 103 indicate a portion of the contents of message 101 to include in message notification 104 and/or message copy 106. For example, rules data 103 may indicate a first set of data (e.g., data identifying the status of a project associated with message 101) to include in message notification 104 and/or message copy 106 and other data (e.g., proprietary pricing data and/or confidential data associated with user devices 120-A-1 and 120-B-1) to exclude from message notification 104 and/or message copy 106.

In another example, rules data 103 may indicate a format for message notification 104, message interface 105, and/or message copy 106. For example, rules data 103 may indicate that message copy 106 should be delivered to user device 120-B-2 in a first format and to user device 120-C in a second format that is more secure (relative to the first format) since user device 120-C is related to a third entity 130-C that is not associated with either of the original transmitting user devices 120-A-1 and 120-B-1.

As shown in FIG. 3, message controller 110 may include message analyzing unit 340 that processes message 101 to determine message data 102, such as contents of message 101 and/or related metadata. For example, message analyzing unit 340 may parse message 101 to extract text, multimedia, and/or other contents carried in message 101. Message analyzing unit 340 may also parse message 101 to extract control data, such as routing information and other metadata. In another example, analyzing unit 340 may process data included in message 101 to identify prominent phrases (e.g., the subject of message 101, the names of people, places of interest, actions to be performed, times when the actions are to be performed, etc.).

In one implementation, message analyzing unit 340 may analyze the data extracted from message 101 to obtain additional metadata. For example, if message 101 includes image data, message analyzing unit 340 may perform image analysis to identify text, objects, people, location, etc. depicted in the image data. Similarly, if message 101 includes audio data, message analyzing unit 340 may perform audio analysis, such as converting speech-to-text, identifying a mood of a speaker, identifying the speaker, identifying non-speech sounds, etc.

Additionally or alternatively, message analyzing unit 340 may interface with another component to obtain additional metadata based on data associated with message 101. For example, message analyzing unit 340 may interface with entity 130 to determine an identity, title, position, task, technical field, etc. associated with a user of user device 120. In another example, message analyzing unit 340 interface with message data storage unit 320 to identify message data 102 associated with other messages related to a similar topic (e.g., including similar text or multimedia content) and/or distributed to related users (e.g., exchanged from user device 120-A-1 and/or 120-B-1 associated with message 101).

As shown in FIG. 3, message controller 110 may include notification generation unit 350 to generate message notification 104. For example, notification generation unit 350 may (1) interface with message data storage unit 320 to obtain message data 102; (2) interface with rules data processing unit 330 to identify user device 120-A-2 to receive message notification 104, and to identify a portion of message data 102 to include in message notification 104; and (3) interface with user device interface unit 310 to forward message notification 104 to a desired recipient.

For example, if message 101 relates to a project, notification generation unit 350 may interface with message data storage unit 320 to obtain message data 102 related to message 101 (e.g., a portion of message 101 identifying the project and additional metadata related to a status of the project), and identify a sender of message 101 (a user associated with user device 120-A-1 and/or 120-B-1). Notification generation unit 350 may then interface with rules data processing unit 330 to determine, based on the message data 102 and/or the sender of message 101, a user device 120-A-2 to receive message notification 104 and information to include in message notification 104. For example, rules data processing unit 330 may identify user device 120-A-2 associated with a supervisor, and notification generation unit 350 may form message notification 104 that includes a portion of message data 102 identifying the project. Notification generation unit 350 may further interface with user device interface unit 310 to cause the generated message notification 104 to be sent to the related user device 120-A-2 (e.g., associated with the supervisor).

As shown in FIG. 3, message controller 110 may also include message copying unit 360 to generate message copy 106. For example, message copying unit 360 may (1) interface with message data storage unit 320 to obtain message data 102; (2) interface with rules data processing unit 330 to identify user devices 120-B-2 and 120-C to receive message copy 106, and a format of message copy 106; and (3) interface with user device interface unit 310 to forward message copy 106 to user devices 120-B-2 and 120-C.

If message 101 relates to a project, message copying unit 360 may interface with message data storage unit 320 to obtain message data 102 related to message 101 (e.g., a portion of message 101 identifying the project) and identify a sender of message 101 (a user associated with user device 120-A-1 and/or 120-B-1). Message copying unit 360 may then interface with rules data processing unit 330 to determine, based on the message data 102, user devices 120-B-2 and 120-C to receive message copy 106 and a format for message copy 106. For example, rules data processing unit 330 may identify a related user device 120-B-2 to receive message copy 106 (e.g., a user device 120-A-2 associated with a co-worker), and message copying unit 360 may format message copy 106 to be compatible with the related user devices 120-B-2. Message copying unit 360 may further interface with user device interface unit 310 to cause the generated message copy 106 to be sent to user devices 120-B-2 and 120-C.

As shown in FIG. 3, message controller 110 may further include interface unit 370 that generates a message interface 105 to enable user device 120-A-3 to access message data 102 (e.g., via user device interface unit 310). For example, interface unit 370 may identify a portion of message data 102 that is available to user device 120-A-3. For example, rules data processing unit 330 may identify a particular message and types of message data 102 associated with the particular message that may be accessed by user device 120-A-3 based on, for example, an associated entity 130, a relationship of user device 120-A-3 to user device 120-A-1 and 120-B-1 sending message 101, etc. Interface unit 370 may generate message interface 105 that enables user device 120-A-3 to access the portion of message data 102 for the particular message 101. For example, message interface 105 may present information identifying certain message data 102 such as a subject, users associated with sending user devices 120-A-1 and 120-B-1, a message type, etc. of message 101. Thus, message interface 105 may not identify message data 102 associated with another message 101 that is not accessible to device 120-A-3 receiving message interface 105.

Message interface 105 may further include information that enables user device 120-A-3 to access other message data 102. For example, message interface 105 may include data (e.g., a storage address in message repository 150, a hyperlink, decoding data, etc.) that may be used by user device 120-A-3 to access a portion of message data 102. For example, message interface 105 may include an access code that enables user device 120-A-3 to access a portion of message data 102.

Interface unit 370 may generate message interface 105 and cause message interface 105 to be sent to user device 120-A-3 (e.g., via user device interface unit 310) based on receiving a request (e.g., a corresponding user input) from user device 120-A-3. Alternatively, interface unit 370 may generate message interface 105 and cause message interface 105 to be sent to user device 120-A-3 without receiving a request. For example, user device 120-A-3 may dynamically receive message interface 105 when a related user device 120-A-1 (e.g., a user device 120 associated with a co-worker) is exchanging message 101.

Although FIG. 3 shows exemplary functional components of message controller 110, in other implementations, message controller 110 may include fewer functional components, different functional components, differently arranged functional components, or additional functional components than those depicted in FIG. 3. Additionally or alternatively, one or more functional components of message controller 110 may perform functions described as being performed by one or more other functional components of message controller 110.

FIG. 4 shows an exemplary table 400 that includes data that may be stored by message repository 150 (e.g., as message data 102) in one implementation. Columns are vertical and rows are horizontal. As shown in FIG. 4, table 400 may include, for example, a message identifier column 410, a user device identifiers column 420, a message type column 430, a message contents column 440, a project identifier column 450, and/or an other data column 460. In table 400, data included in entries in a row may be associated with a same message 101 (e.g., a user device 1-A and 1-B, message type 1, message content 1, project identifier 1, and other data 1 may be associated with message number 1).

Message identifier column 410 may store information, such as an alphanumeric character string, identifying message 101. For example, message identifier column 410 may store information identifying a time when message 101 is sent by one of user devices 120-A-1 or 120-B-1 and/or a time when message one is received by message controller 110. In another example, message identifier column 410 may store information identifying a subject of the message. The subject may be specified by a user input or other data received by user devices 120-A-1 or 120-B-1. Additionally or alternatively, the subject or other information stored in message identifier column 410 may be extracted from the contents of message 101. For example, message identifier 410 may correspond to a prominent and/or commonly used phrase appearing in message 101.

As shown in FIG. 4, table 400 may further include user device identifiers column 420 that stores information identifying at least one of user devices 120-A-1 and/or 120-B-1 that are exchanging message 101. Device identifiers column 420 may store, for example, a network MAC address, a telephone number, IP address, serial number, location (e.g., a global positioning system code), or other identifier that can be used to uniquely identify user devices 120-A-1 and/or 120-B-1. Additionally or alternatively, user device identifiers column 420 may store information identifying a user associated with user devices 120-A-1 and/or 120-B-1. For example, user device identifiers column 420 may store a name, title, position, etc. of the user.

As shown in FIG. 4, table 400 may also include message type column 430. For example, message type column 430 may include data identifying a type of content (e.g., telephone data, audio, text, multimedia, spreadsheet, computer code, web page, SMS, e-mail or other data) included in message 101. Message type column 430 may include data identifying a protocol, format, etc. used to transmit the message 101.

Continuing with FIG. 4, table 400 may further include message contents column 440 that stores information identifying content included in message 101. For example, if message 101 corresponds to an e-mail, SMS, or other textual message, message contents column 440 may store a text string carried in message 101. If message 101 includes multimedia content, such as audio, images, or movies, message contents column 440 may store data associated with the multimedia content and/or a text version of the multimedia (e.g., a transcription of an audio dialog associated with message 101). Additionally or alternatively, message contents column 440 may store data appended to message 101, such as documents being forwarded via message 101.

As shown in FIG. 4, table 400 may also include project identifier column 450 that stores information identifying a project, order, task, etc. associated with message 101. The data in project identifier column 450 may be identified, for example, based on a user input, information included in message 101, the names/position/duties of users associated with user device 120-A-1 and 120-B-1 exchanging message 101, etc. For example, if message 101 corresponds to an e-mail, the data in project identifier column 450 may be determined from a subject associated with the e-mail. If message 101 includes multimedia content, such as telephone, audio, or movie data, the data in project identifier column 450 may be determined from keywords (e.g., frequently spoken words) included in the multimedia content.

As shown in FIG. 4, table 400 may further include other data column 460. For example, other data column 460 may store data identifying a geographic location or other information associated with user device 120-A-1 or 120-B-1. Additionally or alternatively, other data column 460 may include information regarding a project identified in project identifier column 450. For example, other data column 460 may include information regarding a status of the project, pending actions, future events, responsible people, etc.

Although FIG. 4 shows exemplary data stored in table 400, in other implementations, table 400 may include fewer, different, differently arranged, or additional columns than those depicted in FIG. 4. Additionally or alternatively, one or more columns of table 400 may store data described as being stored by one or more other columns of table 400.

Figure 5A:
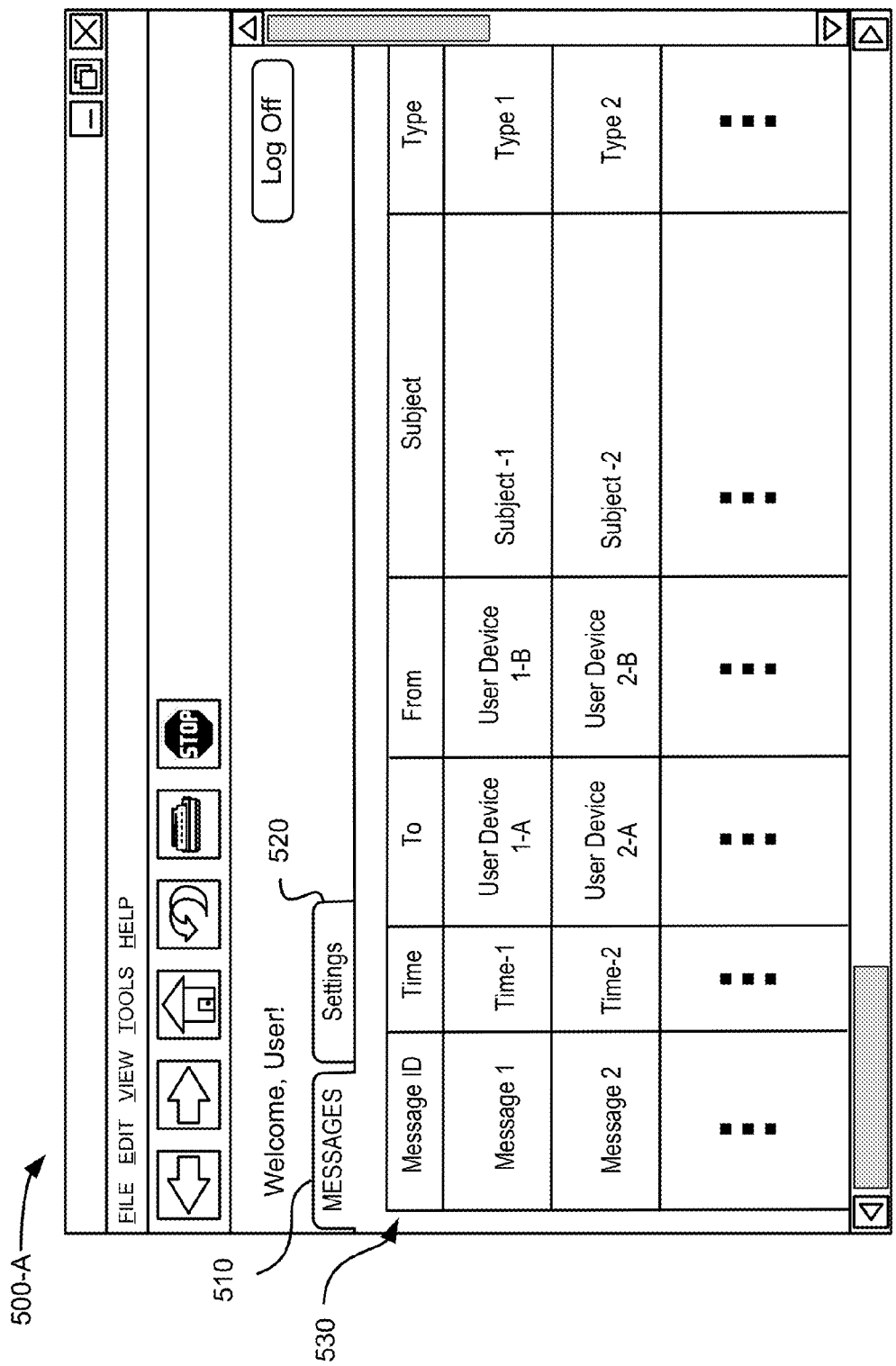
FIGS. 5A-5D show exemplary displays that may be presented within the environment of FIG. 1.

FIGS. 5A-5D show an exemplary displays 500-A through 500-D that may be presented by a user device 120 in connection with message interface 105. As shown in FIG. 5A, display 500-A may include, for example, a messages tab 510 and a settings tab 520. As further shown in FIG. 5A, when message tab 510 is selected, display 500-A may present a portion 530 of message data 102 (e.g., from table 400 in FIG. 4). In the example, shown in FIG. 5A, portion 530 may display information in a horizontal row, from left to right: identifying a message identifier (e.g., from message identifier column 410); a time when the message 101 is sent (e.g., from other data column 460); user devices 120 exchanging message 101 (e.g., from user device identifiers column 420); a subject of message 101 (e.g., from message contents column 440); a message type column (e.g., from other data column 460); etc.

Portion 530 may include information associated with one or more messages 101 which are available for access and/or are reported to user viewing display 500-A. The messages identifying in portion 530 may be determined based on rules data 103. For example, if the user is assigned to a project, portion 530 may display data for messages 101 related to that project (e.g., messages 101 associated with particular data in project value column 450). In another example, if the user is a supervisor, display 500-A may present data associated with messages 101 exchanged between a user overseen by the supervisor.

As shown in FIG. 5A, display 500-A may include graphical elements that may be used to navigate between data, such as a vertical scroll bar 540 that a user may use to view data regarding different messages 101 and horizontal scroll bar 550 that a user may use to view different types of data regarding a message 101.

Figure 5B:
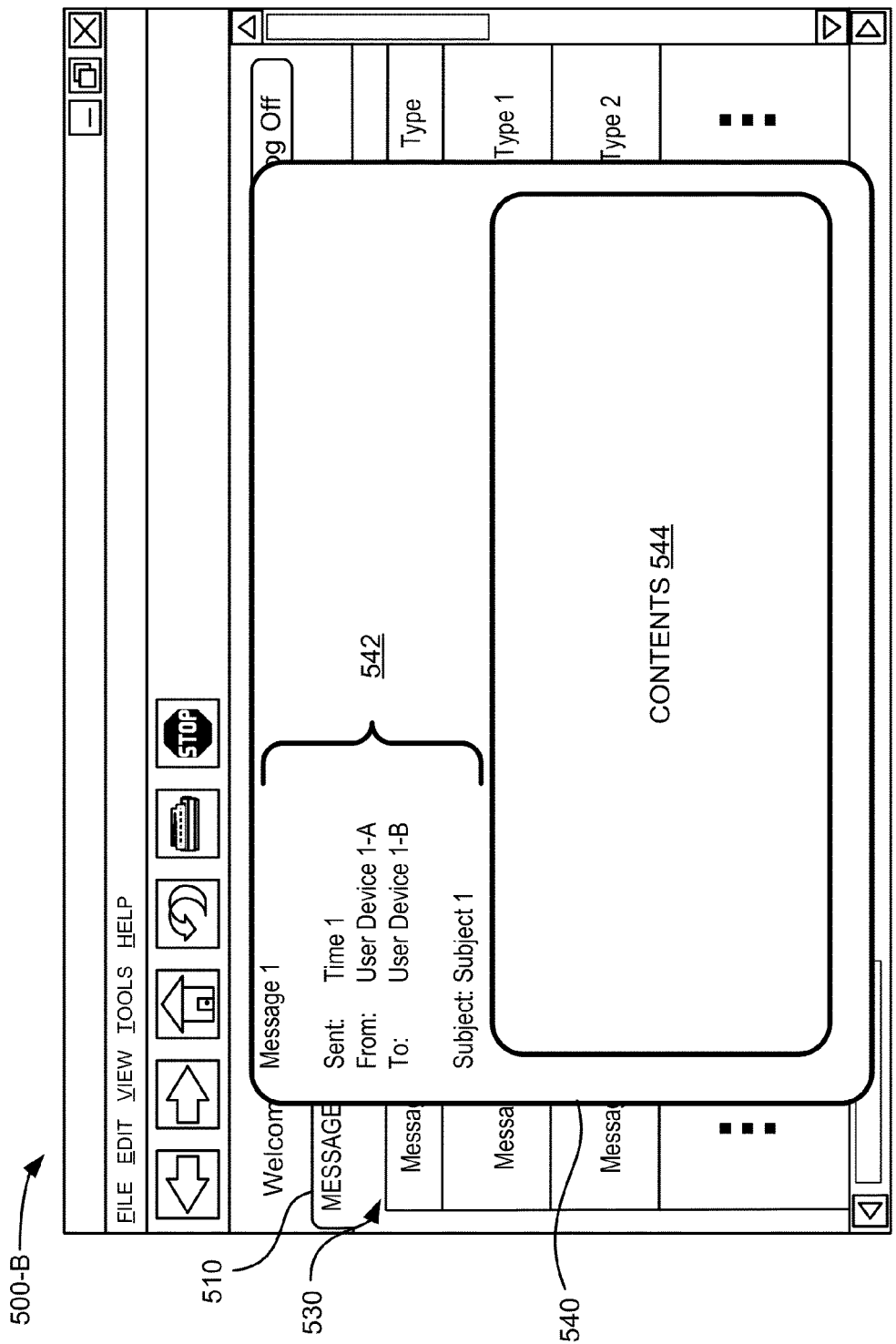

If a user selects one of the messages 101 identified in portion 530 (for example, a user input is received in a region of portion 530), additional information regarding the selected message 101 may be presented. For example, as shown in FIG. 5B, a message window 540 may present information regarding a selected message 101. Message window 540 may include a header sections 542 that presents a portion of message data 102, such as a message identifier (e.g., from message identifier column 410); a time when the message 101 is sent (e.g., from other data column 460); user devices 120 exchanging message 101 (e.g., from user device identifiers column 420); and a subject of message 101 (e.g., from message contents column 440). Message window 540 may further include a contents sections 544 showing the contents of message 101 (e.g., from message contents column 440). For example, contents sections 544 may include text, images, video, audio, or other data included in message 101

Figure 5C:
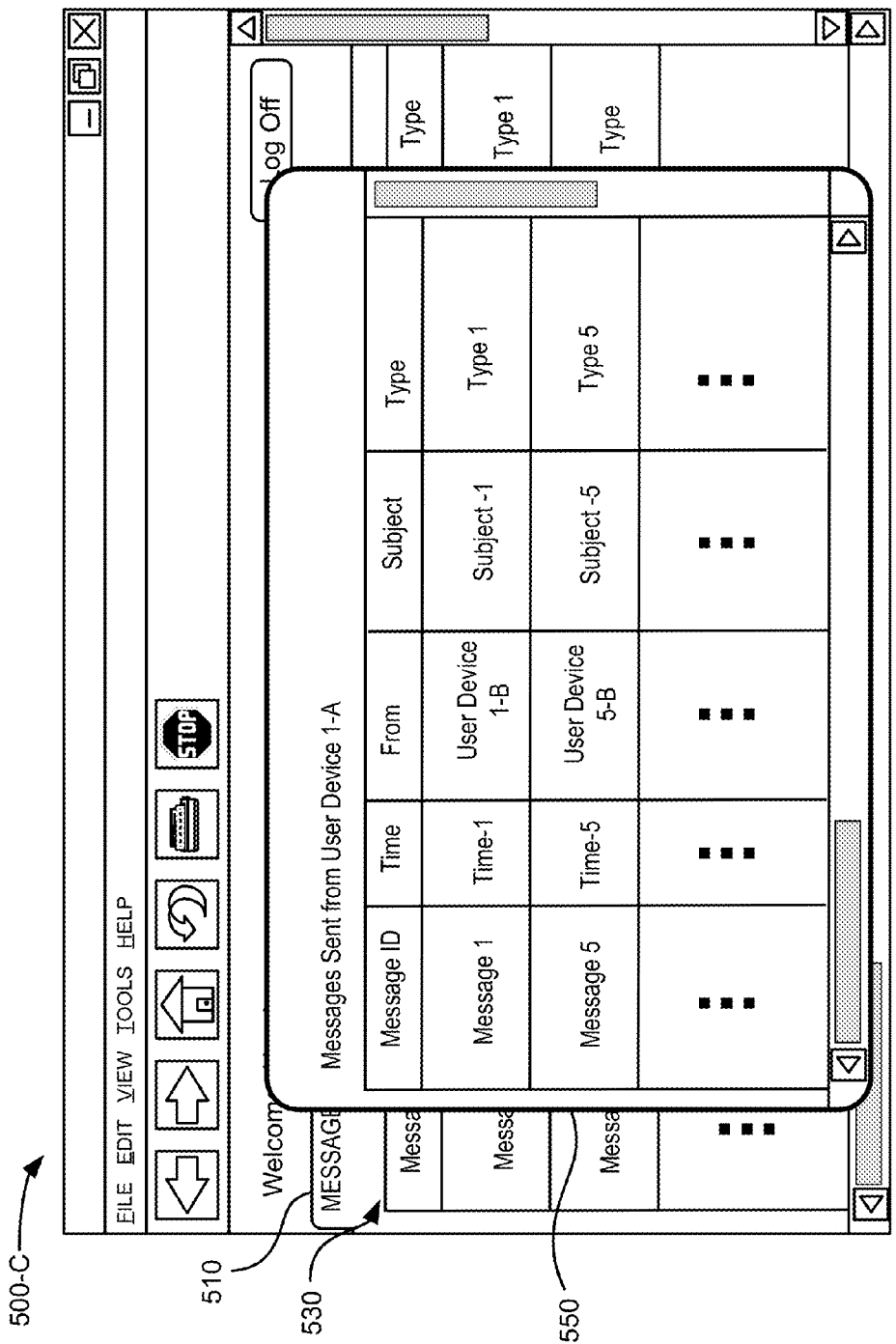
Figure 5D:
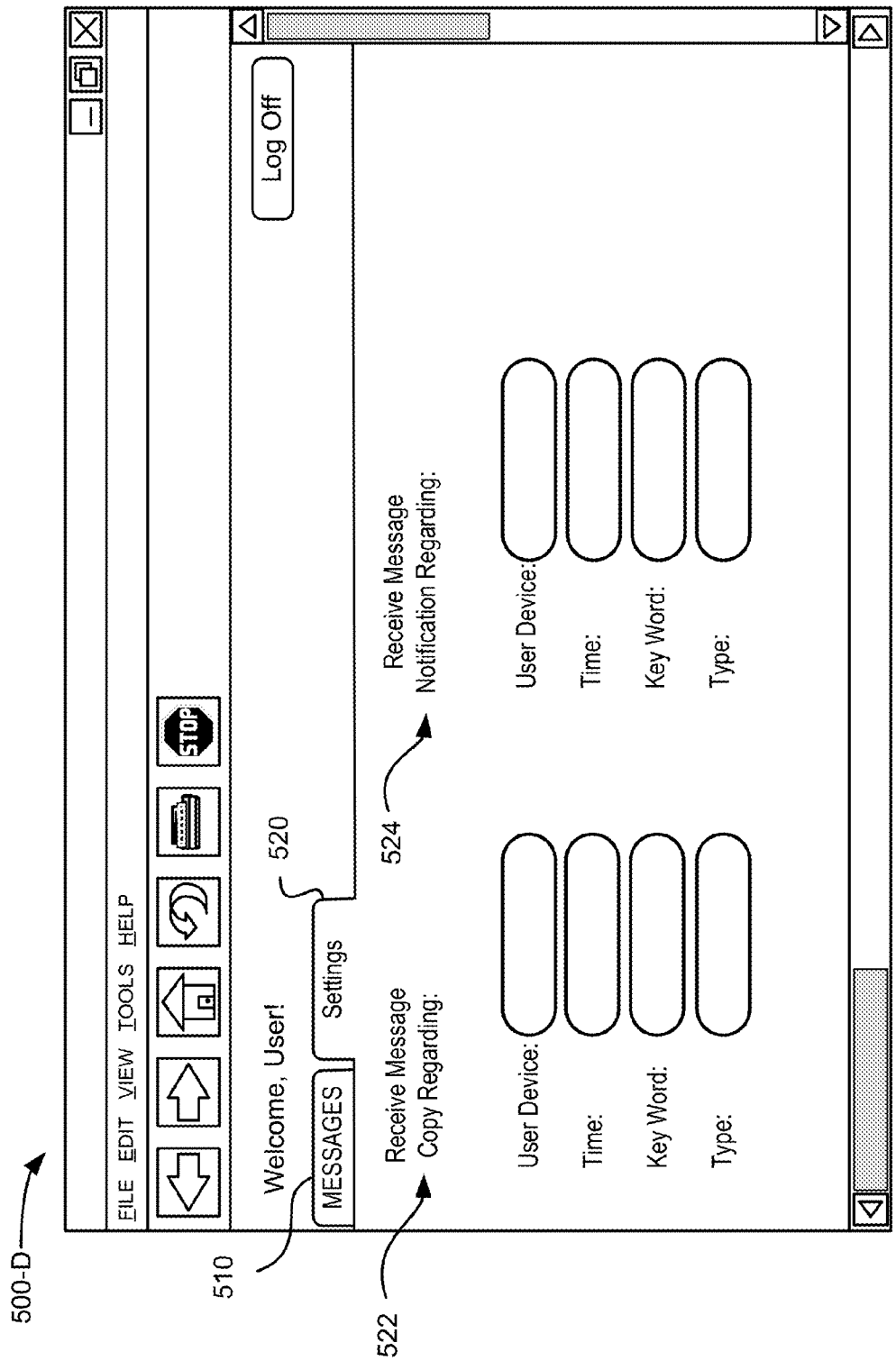

If a different section of portion 530 is selected, message interface 105 may present different information related to the selection. For example, as shown in FIG. 5C, display 500-C may present a user device message window 550 that identifies data associated with different messages 101 sent/received from different user devices 120 ("user device 1-A" in FIG. 5C). For example, if "user device 1-A" has sent "message 1" and "message 5," user device message window 550 may present data associated with messages 1 and 5. In another example (not shown), display 500-C may present data related to a different subset of messages 101. For example, if a project is selected, display 500-C may present data related to the selected project (as identified in project identifier column 450).

In one implementation, settings tab 520 may present a display 500-D that includes an interface that enables a user to specify types of messages to be reported and/or forwarded to the user. For example, settings tab 520 may include a message copy section 522 that includes input fields that allow the user to specify attributes of messages 101 to be forwarded to the user (e.g., as message copy 106). Additionally or alternatively, setting tab 520 may include a notification section 524 that presents input fields that allow the user to specify attributes of messages 101 to be reported to the user (e.g., as message notification 104). In the example shown in FIG. 5D, each of copy section 522 and reporting sections 524 may include input fields that allow the user to request message controller 110 to forward a message notification 104 and/or a message copy 106 when a message 101 is associated with a particular user, sent at a particular time, related to a particular keyword, and/or message type.

Although FIGS. 5A-5D show exemplary features that of displays 500-A through 500-D, in other implementations, displays 500-A through 500-D may include fewer, different, differently arranged, or additional features than those depicted in FIGS. 5A-5D.

Figure 6:
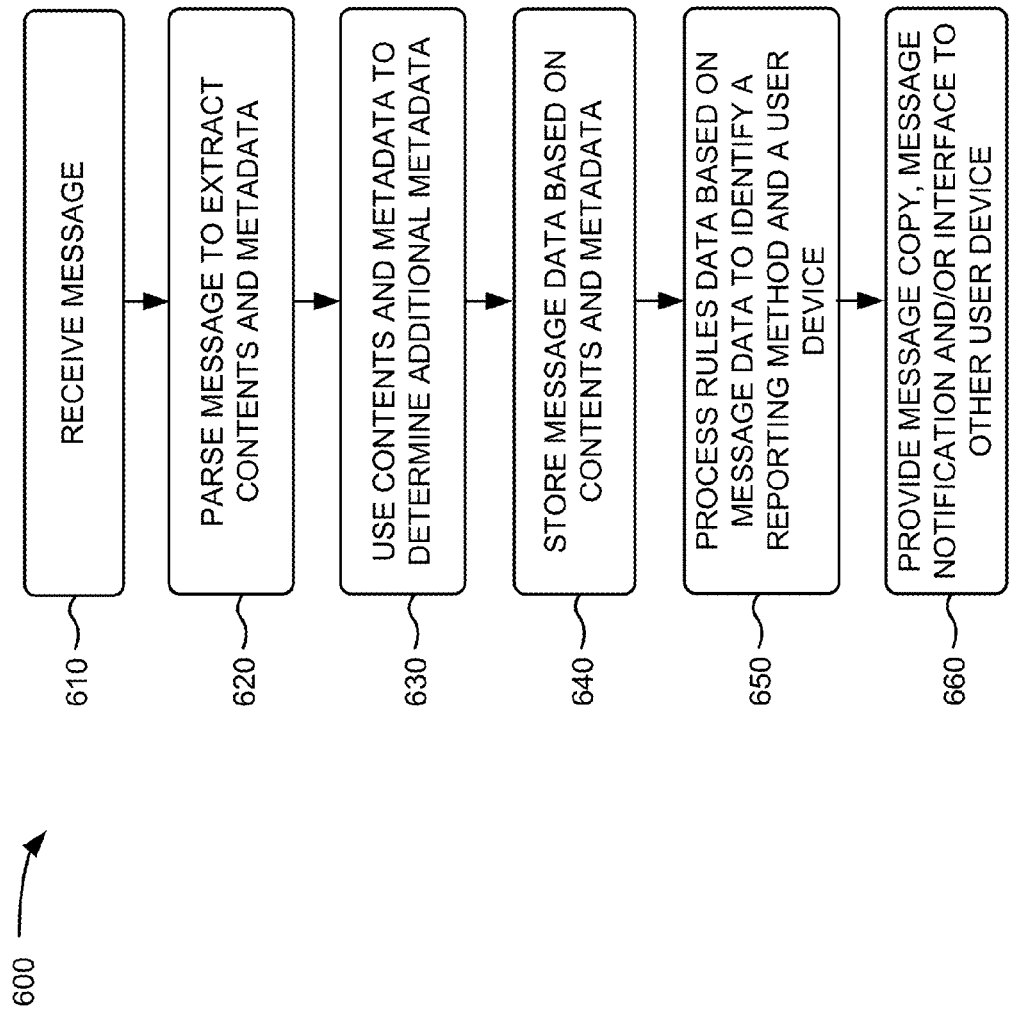
FIG. 6 is a flowchart of an exemplary process for reporting a message to one or more user devices included in the environment of FIG. 1.

FIG. 6 is a flowchart of a process 600 for reporting message 101 to one or more user devices 120 according to an implementation described herein. In some implementations, process 600 may be performed by message controller 110 (e.g., by the functional components of message controller 110 shown in FIG. 3). In other implementations, some or all of process 600 may be performed by another device or a group of devices separate from and/or including message controller 110.

Process 600 may include receiving message 101 (block 610). User device interface unit 310 may function to obtain message data associated with message 101 from user devices 120-A-1 and 120-B-1. For example, user device interface unit 310 may interface with a routing/networking device (not shown) to cause a copy of message 101 to be routed to user device interface unit 310. Alternatively, user device interface unit 310 may interface with the routing/networking device to cause message controller 110 to be included in a communications path between user devices 120-A-1 and 120-B-1 (e.g., so that message 101 is routed via message controller 110). Additionally or alternatively, user device interface unit 310 may further communicate with the routing/networking device to receive routing information regarding message 101, such as data identifying user devices 120-A-1 and 120-B-1, a protocol used to exchange message 101, a time when message 101 is sent, data regarding other messages exchanged between user devices 120-A-1 and 120-B-1 during a particular time period, information regarding related messages (e.g., message associated with similar content) exchanged between user device 120-A-1 or 120-B-1 and another user device 120, etc.

As shown in FIG. 6, process 600 may further include parsing message 101 to obtain the contents of message 101 and related metadata. For example, message analyzing unit 340 may parse message 101 to extract text, multimedia, and/or other contents. Message analyzing unit 340 may also parse message 101 to extract control data, such as routing information. In another example, message analyzing unit 340 may process data included in message 101 to identify prominent phrases (e.g., the subject of message 101, the names of people, places of interest, actions to be performed, times when the actions are to be performed, etc.

As shown in FIG. 600, process 600 may further include using the contents and the metadata from message 101 to determine additional metadata (block 630). For example, if message 101 includes image data, message analyzing unit 340 may perform image analysis to identify text, objects, people, places, etc. associated with the image data. Similarly, if message 101 includes audio data, message analyzing unit 340 may perform audio analysis, such as converting speech to text, identifying a mood of a speaker, identifying the speaker, identifying non-speech sounds, etc. Additionally or alternatively, message analyzing unit 340 may interface with another component to obtain additional metadata based on data associated with message 101. For example, message analyzing unit 340 may interface with entity 130 to determine an identity, title, position, task, technical field, etc. associated with a user of user device 120. In another example, message analyzing unit 340 may interface with message data storage unit 320 to identify message data 102 associated with other messages related to a similar topic (e.g., including similar text or multimedia content) and/or distributed to related users (e.g., exchanged from user device 120-A-1 and/or 120-B-1 associated with message 101).

As shown in FIG. 6, process 600 may further include storing message data 102 based on the contents of message 101 and the associated metadata (block 640). For example, message data storage unit 320 may store data from message 101 (e.g., its contents) to message repository 150. For example, if message 101 includes text (e.g., message 101 corresponds to an e-mail, text document, SMS message, etc.), message data storage unit 320 may store a text string included in message 101 to message repository 150. If message 101 includes multimedia content, such as audio and/or video content, message data storage unit 320 may store the audio and/or video content to message repository 150. Alternatively, message data storage unit 320 may identify a location for storage contents of message 101 (e.g., a memory in user device 120-A-1 and/or 120-B-1 or another device) and may store data identifying the storage location to message repository 150.

In block 640, message data storage unit 320 may also store metadata from message 101. For example, message data storage unit 320 may receive metadata from user device interface unit 310 related to the transmission of message 101, such as data identifying user devices 120-A-1 and 120-B-1, other user devices 120 receiving message 101, a protocol used to transmit message 101, etc. In another example, message data storage unit 320 may receive metadata from message analyzing unit 340 that is extracted from message 101 and/or obtained using information extracted from message 101. For example, message data storage unit 320 may receive metadata from message analyzing unit 340 related to other messages associated with a subject (e.g., a keyword) of message 101.

In one implementation, when storing message data 102 to message repository 150, message data storage unit 320 may store, as message data 102, data from message 101 and/or related metadata in a received format. For example, message data storage unit 320 may store contents from message 101 in a format/protocol used within message 101. Alternatively, message data storage unit 320 may process and store message data 102 in a different format. For example, message data storage unit 320 may convert message data 102 to a different format that is more secure, compressed (e.g., requiring less storage space in message repository 150), and/or easier to access and/or locate within message repository 150.

As shown in FIG. 6, process 600 may also include obtaining rules data 103 from rules repository 140 and processing the rules based on the contents and metadata associated with message 101 (block 650). For example, rules data processing unit 330 may determine and apply rules data 103 associated with message 101 based on message data 102 received from message data storage unit 320. For example, rules data processing unit 330 may select applicable rules data 103 based on the position/title of users associated with user devices 120-A-1 and 120-B-1; based on the contents of message 101; based on other metadata include in message data 102 (e.g., a status of a project referenced within message 101); etc.

For example, rules data processing unit 330 may use rules data 103 to identify user devices 120-B-2 and 120-C to receive message copy 106 and another user device 120-A-2 to receive message notification 104. In one implementation, rules data 103 indicate a portion of the contents of message 101 to include in message notification 104 and/or message copy 106. For example, rules data 103 may indicate a first set of data (e.g., data identifying the status of a project associated with message 101) to include in message notification 104 and/or message copy 106 and other data (e.g., proprietary pricing data and/or confidential data associated with user devices 120-A-1 and 120-B-1) to exclude from message notification 104 and/or message copy 106.

In another example, rules data 103 may indicate a format for message notification 104, message interface 105, and/or message copy 106. For example, rules data 103 may indicate that message copy 106 should be delivered to user device 120-B-2 in a first format and to user device 120-C in a second format that is more secure (relative to the first format) since user device 120-C is related to a third entity 130-C that is not associated with either the originally transmitting user devices 120-A-1 and 120-B-1.

As shown in FIG. 6, process 600 may still further include providing message copy, message notification and/or interface to an identified user device (block 660). For example, notification generation unit 350 may generate message notification 104. Notification generation unit 350 may (1) interface with message data storage unit 320 to obtain message data 102; (2) interface with rules data processing unit 330 to identify user device 120-A-2 to receive message notification 104, and to identify a portion of message data 102 to include in message notification 104; and (3) interface with user device interface unit 310 to forward message notification 104 to a desired recipient.

In another example, message copying unit 360, included in message controller 110, may generate message copy 106. For example, message copying unit 360 may (1) interface with message data storage unit 320 to obtain message data 102; (2) interface with rules data processing unit 330 to identify user devices 120-B-2 and 120-C to receive message copy 106, and a format of message copy 106; and (3) interface with user device interface unit 310 to forward message copy 106 to user devices 120-B-2 and 120-C.

In another example, message controller 110 may include interface unit 370 that generates a message interface 105 to enable user device 120-A-3 to access message data 102 (e.g., via user device interface unit 310). For example, interface unit 370 may identify a portion of message data 102 that is accessible by user device 120-A-3. For example, rules data processing unit 330 may identify a particular message and types of message data 102 associated with the particular message that may be accessed by user device 120-A-3 based on, for example, an associated entity 130, a relationship of user device 120-A-3 to user device 120-A-1 and 120-B-1 sending message 101, etc. Interface unit 370 may generate message interface 105 that enables user device 120-A-3 to access the portion of message data 102 for the particular message 101. For example, message interface 105 may present information identifying certain message data 102 such as a subject, users associated with sending user devices 120-A-1 and 120-B-2, a message type, etc. of message 101.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to process 600 in FIG. 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code, it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, by a processor, a message sent between a first user device and a second user device of a plurality of user devices;
    storing, by the processor, message data associated with the message, wherein the message data include contents of the message and metadata included in the message;
    identifying, by the processor and based on the message data, a third user device and a fourth user device from the plurality of user devices;
    generating, by the processor and based on the message data, a message copy that includes a first portion of the contents and excludes a second portion of the contents;
    forwarding, by processor, the message copy to the third user device;
    generating, by the processor and based on the message data, a message notification that includes a first portion of the metadata and excludes a second portion of the metadata;
    forwarding, by the processor, the message notification to the fourth user device;
    identifying, by the processor, a portion of the message data that is accessible to a fifth user device of the plurality of user devices, wherein the identified portion includes at least one of a subject of the message, an addressee of the message, or a message type associated with the message; and
    providing, by the processor, an interface to enable the fifth user device to access the identified portion of the message data.

2. The method of claim 1, wherein the identified portion includes the subject of the message, and the method further comprising:
    extracting the subject of the message from the contents of the message.

3. The method of claim 1, wherein the first user device and the second user device are associated with at least one first entity, and at least one of the third user device or the fourth user device is associated with a second entity that differs from the at least one first entity, the method further comprising:
    identifying, in the second portion of the contents, at least one of proprietary information or confidential information associated with the at least one first entity.

4. The method of claim 1, wherein the contents are in a first format,
    and wherein generating the message copy includes:
    determining whether the first format is compatible with the third user device;
    when the first format is incompatible with the third user device, identifying a second format that is compatible with the third user device;
    converting the first portion of the contents to the second format; and
    including the converted first portion of the contents in the message copy.

5. The method of claim 1, wherein the message includes audio content, and wherein generating the message copy includes:
    performing speech-to-text analysis on the audio content to generate a text string associated with the audio content; and
    including the text string in the message copy.

6. The method of claim 1, wherein identifying the third user device and the fourth user device includes:
    identifying, based on the message data, an attribute of the message, and
    selecting the third user device and the fourth user device from the plurality of user devices based on the attribute.

7. The method of claim 1, wherein identifying the third user device and the fourth user device includes:
- identifying, based on the message data, an attribute associated with the message;
- selecting another message from a plurality of messages based on the attribute;
- determining other metadata, wherein the other metadata is associated with the other message; and
- identifying the third user device and the fourth user device based on the other metadata.

8. A device comprising:
- a memory configured to store instructions
- a processor configured to execute one or more of the instructions to:
  - receive a message sent between a first user device and a second user device of a plurality of user devices;
  - store message data associated with the message, wherein the message data include contents of the message and metadata included in the message;
  - identify, based on the message data, a third user device and a fourth user device from the plurality of user devices;
  - generate, based on the message data, a message copy that includes a first portion of the contents and excludes a second portion of the contents;
  - forward the message copy to the third user device;
  - generate, based on the message data, a message notification that includes a first portion of the metadata and excludes a second portion of the metadata;
  - forward the message notification to the fourth user device;
  - identify a portion of the message data that is accessible to a fifth user device of the plurality of user devices, wherein the identified portion includes at least one of a subject of the message, an addressee of the message, or a message type associated with the message; and
  - provide an interface to enable the fifth user device to access the identified portion of the message data.

9. The device of claim 8, wherein the identified portion includes the subject of the message, and the processor is further configured to:
- extract the subject of the message from the contents of the message.

10. The device of claim 8, wherein the first user device and the second user device are associated with at least one first entity, and at least one of the third user device or the fourth user device is associated with a second entity that differs from the at least one first entity, and wherein the processor is further configured to:
- identify, in the second portion of the contents, at least one of proprietary information or confidential information associated with the at least one first entity.

11. The device of claim 8, wherein the contents are in a first format, and wherein the processor, when executing the one or more of the instructions to generate the message copy, is further configured to:
- determine whether the first format is compatible with the third user device;
- when the first format is incompatible with the third user device, identify a second format that is compatible with the third user device;
- convert the first portion of the contents to the second format; and
- include the converted first portion of the contents in the message copy.

12. The device of claim 8, wherein the message includes audio content, and wherein the processor, when executing the one or more of the instructions to generate the message copy, is further configured to:
- perform speech-to-text analysis on the audio content to generate a text string associated with the audio content; and
- include the text string in the message copy.

13. The device of claim 8, wherein the processor, when executing the one or more of the instructions to identify the third user device and the fourth user device, is further configured to:
- identify, based on the message data, an attribute of the message, and
- select the third user device and the fourth user device from the plurality of user devices based on the attribute.

14. The device of claim 8, wherein the processor, when executing the one or more of the instructions to identify the third user device and the fourth user device, is further configured to:
- identify, based on the message data, an attribute associated with the message;
- select another message from a plurality of messages based on the attribute;
- determine other metadata, wherein the other metadata is associated with the other message; and
- identify the third user device and the fourth user device based on the other metadata.

15. A non-transitory computer-readable medium configured to store instructions, the instructions comprising:
- one or more instructions that, when executed by a processor, cause the processor to:
  - receive a message sent between a first user device and a second user device of a plurality of user devices;
  - store message data associated with the message, wherein the message data include contents of the message and metadata included in the message;
  - identify, based on the message data, a third user device and a fourth user device from the plurality of user devices;
  - generate, based on the message data, a message copy that includes a first portion of the contents and excludes a second portion of the contents;
  - forward the message copy to the third user device;
  - generate, based on the message data, a message notification that includes a first portion of the metadata and excludes a second portion of the metadata;
  - forward the message notification to the fourth user device;
  - identify a portion of the stored message data that is accessible to a fifth user device of the plurality of user devices, wherein the identified portion includes at least one of a subject of the message, an addressee of the message, or a message type associated with the message; and
  - provide an interface to enable the fifth user device to access the identified portion of the stored message data.

16. The non-transitory computer-readable medium of claim 15, wherein the identified portion includes the subject of the message, and the one or more instructions, when executed by the processor, further cause the processor to:
- extract the subject of the message from the contents of the message.

17. The non-transitory computer-readable medium of claim 15, wherein the contents are in a first format, and wherein the one or more instructions, when executed by the processor to generate the message copy, further cause the processor to:
    determine whether the first format is compatible with the third user device;
    when the first format is incompatible with the third user device, identify a second format that is compatible with the third user device;
    convert the portion of the content to the second format; and
    include the converted portion of the content in the message copy.

18. The non-transitory computer-readable medium of claim 15, wherein the message includes audio content, and wherein the one or more instructions, when executed by the processor to generate the message copy, further cause the processor to:
    perform speech-to-text analysis on the audio content to generate a text string associated with the audio content; and
    include the text string in the message copy.

19. The non-transitory computer-readable medium of claim 15, wherein the one or more instructions, when executed by the processor to identify the third user device and the fourth user device, further cause the processor to:
    identify, based on the message data, an attribute of the message, and
    select the third user device and the fourth user device from the plurality of user devices based on the attribute.

20. The non-transitory computer-readable medium of claim 15, wherein the one or more instructions, when executed by the processor to identify the third user device and the fourth user device, further cause the processor to:
    identify, based on the message data, an attribute associated with the message;
    select another message from a plurality of messages based on the attribute;
    determine other metadata, wherein the other metadata is associated with the other message; and
    identify the third user device and the fourth user device based on the other metadata.

* * * * *